United States Patent Office 3,447,315
Patented June 3, 1969

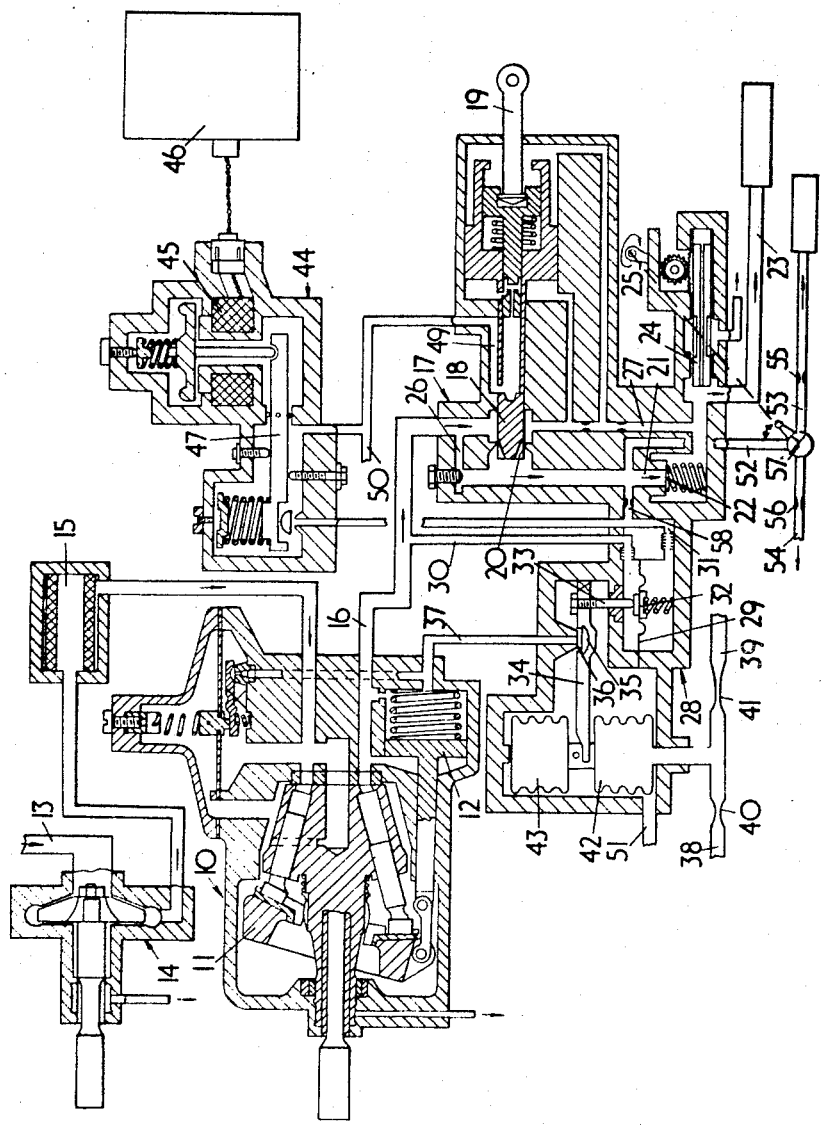

3,447,315
FUEL SYSTEMS FOR GAS TURBINE ENGINES
Geoffrey Albert Long, Sutton Coldfield, England, assignor to Joseph Lucas (Industries) Limited, Birmingham, England, a British company
Filed Feb. 14, 1967, Ser. No. 615,993
Int. Cl. F02c 9/04
U.S. Cl. 60—39.28   3 Claims

ABSTRACT OF THE DISCLOSURE

A fuel system having a pump for delivering fuel to the engine under the control of a throttle valve, has a shut off valve controlling flow to the main burner supply passage and there is a subsidiary passage supplying fuel to a starter burner passage through a control valve, this valve and the shut off valve being operable together so that as the shut off valve is opened to permit flow through the main burner supply passage, supply through the starter burner passage is reduced.

---

This invention relates to fuel systems for gas turbine engines and of the kind including a pump, a throttle valve through which fuel is intended to flow from the pump to at least one main burner in the engine, means for controlling the output of the pump in accordance with the opening of the throttle valve, a shut off valve disposed downstream of the throttle valve which can be actuated to stop flow to the main burner or burners in the engine, and means for supplying fuel to a starter burner or burners. Such a system will be referred to for convenience as being of the kind specified.

It is required that the starter burner or burners should be supplied with fuel only when the engine is actually being started, the supply being cut off when this operation has been completed. Before starting, the fuel supply to the main burner or burners is cut off but when the engine has started and as the supply to the starter burner or burners is reduced, the supply to the main burner or burners is commenced.

The object of the invention is to provide a fuel system of the kind specified in which this requirement can be met.

In accordance with the present invention, a fuel system of the kind specified for a gas turbine engine includes subsidiary supply passage means for connection to the starter burner or burners, said subsidiary passage means communicating with main supply passage means for the supply of fuel to the main burners, said shut off valve being disposed in said main supply passage means at a position downstream of said communication with said subsidiary supply passage means, and a control valve in said subsidiary supply passage means whereby a proportion only of the fuel supplied thereto can reach the starter burner or burners, said control valve being actuable in conjunction with the shut off valve in such manner that as the shut off valve is opened to permit flow of fuel to the main burners, the supply to said starter burner or burners is reduced.

An example of the invention will now be described with reference to the accompanying drawings which is a diagrammatic representation of a fuel system for a gas turbine engine particularly for use in aircraft.

The system comprises an engine driven pump indicated at 10 which is conveniently of the variable angle swash plate type the swash plate 11 being movable angularly by means of a servo-device 12. The pump 10 is supplied with fuel from a pipe 13 from a reservoir not shown and there is a boost pump indicated at 14 which is of the centrifugal type between the pipe 13 and the pump 10 and there is also a filter 15.

Fuel at a high pressure leaves the pump through the pipe 16 and flows through a body 17 which contains a throttle 18 which is controllable by means of a lever 19 by the pilot.

The fuel flows past a metering edge 20 of said throttle 18 through a passage 21 and past a pressurising valve 22 to a pipe 23 leading to a plurality of burners in the engine. Downstream of the pressurising valve 22 in the body 17 is a shut off valve 24 which may be manually controlled by means of a lever 25. By-passing the throttle 18 is a restricted passage 26 and there is also a restricted passage 27 by-passing the throttle 18 and the pressurising valve 22.

In order to control the output of the pump 10 in accordance with the pressure drop across the throttle 18, there is a device 28 incorporating a diaphragm 29 to opposite sides of which the pressure at the upstream and downstream side respectively of the throttle 18 is exerted through passages 30 and 31 respectively.

The diaphragm 29 has a member 32 supported thereby which acts upon a rod 33 connected to a pivoted lever 34. The lever 34 carries a half ball 35 which can co-operate with a seating 34 formed at the end of a passage 37 leading to a servo-device 12 of the pump 10. The position of the lever 34 is further determined by a pressure derived from the air intake to engine or other source. To obtain this pressure there are two passages 38, 39 which are restricted at 40, 41 respectively. This arrangement acts as a potentiometer, the intermediate pressure of which is applied to a capsule 42 connected to a second capsule 43 which is evacuated, the assembly of the two capsules 42, 43 carrying the end of the lever 34.

This apparatus thus far described is substantially of conventional form and in operation the quantity of fuel supplied to the main burners through the pipe 23 is controlled in accordance firstly with the setting of the throttle lever 19 and secondly in accordance with the difference of the pressures upstream and downstream of the throttle 18, and thirdly in accordance with the pressure in the capsule 42.

The pressure drop across the throttle 18 moreover is modified in accordance with temperature conditions the device 44 being provided to sense this. The device 44 includes a solenoid 45 receiving a signal from a signal generating device 46, the solenoid actuating a lever 47 for controlling the flow of fuel through the passage 31 which communicates with the main passages 21 through a restricted passage 58, and also communicates with a chamber at one side of the diaphragm 29. The escape passage 50 for fuel from the device 44 leads to the boost pump 14 and there is also a further escape passage joining the passage 50, from a compartment 49 around the throttle 18.

In applying the invention to this apparatus the body 17 has a passage 52 through which fuel from the passage 21 leading to the main burners allows fuel to flow into a pair of passages 53, 54 which are provided with respective restrictors 55, 56 and access to these passages 53, 54 being controlled in accordance with the position of a valve 57. The passage 53 is arranged to communicate with a number of starter burners in the engine and the passage 54 is arranged to communicate with the boost pump for the return of a quantity of fuel which is not required to the starter burners.

In order to accomplish this the restrictor 55 affords a greater restriction to flow than does the restrictor 56, thus a fixed proportion of the fuel which is delivered to the passage 52 and which passes through the valve 57 will reach the starter burners and the greater remaining proportion will be returned to the boost pump 14.

There is a mechanical connection (shown by dash line) between the valve 57 and the shut off valve 25 in the passage leading to the main burners the arrangement being such that when the shut off valve is closed the valve 57 is open and vice-versa.

In order to start the engine it is rotated by some external means so as to provide a supply of pressurised fuel from the pump 10 along the pipe 16 and through the throttle 18 which is appropriately positioned, and the shut off valve 24 is closed so that the valve 57 is open. Fuel now flows through the passages 53, 54 and as previously explained, a small proportion reaches the starter burners along the passage 53 whilst the greater proportion is spilled to the boost pump 14 through the passage 54. When the engine starts it is arranged that as the pilot opens the throttle 19 to increase the total flow of fuel to the engine the shut off valve 24 is opened as the valve 57 is closed a position will be reached in which fuel supply to the starter burners is cut off completely and the shut off valve 24 is fully opened so that the supply to the engine takes place through the pipe 23 to the main burners in the engine.

In the form of system described and shown in the drawings there is described a particular arrangement of parts but it will be appreciated that these can be varied in accordance with changing requirements and components such as the throttle 18 can be replaced by other forms of device performing substantially the same function.

Having thus described my invention what I claim as new and desire to secure by Letters Patent is:

1. In a fuel system for a gas turbine engine including a throttle valve through which fuel can flow from the pump through a main supply passage to at least one main burner in the engine; means for controlling the output of the pump in accordance with the opening of said throttle valve; and a shut off valve actuatable to stop the flow to said main burner; the improvement consisting in a subsidiary supply passage for connection to at least one starter burner, said subsidiary passage communicating with said main supply passage; said shut off valve being disposed in said main supply passage at a position downstream of said subsidiary supply passage; a control valve and a first restriction respectively in said subsidiary supply passage going towards said starter burner, and a second restriction in a further passage leading from said control valve to a low pressure area, the size of said first and second restrictions being such as to control the proportioning of the fuel supplied to said starter burner, the remainder of said fuel passing through said further passage, and said control valve being actuatable in conjunction with said shut off valve in such manner that as the shut off valve is opened to permit flow of fuel to the main burner the control valve is closed.

2. A fuel system as claimed in claim 1, wherein said further passage leads to said pump, and said first restriction is greater than said second restriction so that a greater fixed proportion of fuel will be passed to said pump.

3. A fuel system as claimed in claim 1, wherein said shut off valve and said control valve are mechanically connected.

References Cited

UNITED STATES PATENTS

| | | | |
|---|---|---|---|
| 2,694,899 | 11/1954 | Hague | 60—39.14 |
| 2,685,334 | 8/1954 | Davies | 60—39.28 XR |
| 3,177,921 | 4/1965 | Turner | 60—39.28 XR |

JULIUS E. WEST, *Primary Examiner.*

U.S. Cl. X.R.

23—288; 60—39.74, 258; 252—477